United States Patent
Baetz et al.

(10) Patent No.: US 10,534,149 B2
(45) Date of Patent: Jan. 14, 2020

(54) OPTICAL FIBER CABLE

(71) Applicant: CORNING OPTICAL COMMUNICATIONS LLC, Hickory, NC (US)

(72) Inventors: Holger Baetz, Neustadt bei Coburg (DE); Anne Germaine Bringuier, Taylorsville, NC (US); Ravinder Kumar Kinnera, Berlin (DE); Wesley Brian Nicholson, Hickory, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/889,501

(22) Filed: Feb. 6, 2018

(65) Prior Publication Data

US 2018/0231729 A1 Aug. 16, 2018

Related U.S. Application Data

(63) Continuation of application No. PCT/US2016/045306, filed on Aug. 3, 2016.
(Continued)

(51) Int. Cl.
*G02B 6/44* (2006.01)

(52) U.S. Cl.
CPC ......... *G02B 6/4436* (2013.01); *G02B 6/4435* (2013.01); *G02B 6/4496* (2013.01); *G02B 6/4434* (2013.01)

(58) Field of Classification Search
CPC .. G02B 6/4436; G02B 6/4435; G02B 6/4496; G02B 6/4434
See application file for complete search history.

(56) References Cited

U.S. PATENT DOCUMENTS

| 4,547,626 A | 10/1985 | Pedersen et al. |
| 5,709,916 A | 1/1998 | Akagi et al. |

(Continued)

FOREIGN PATENT DOCUMENTS

| CA | 1280304 C | 2/1991 |
| CN | 204257261 U | 4/2015 |

(Continued)

OTHER PUBLICATIONS

Cable Design, Loose Fiber Optical Cable—Dry Core—Lead Sheathed—Steel Wire Armour; Draka Comteq; Date Unknown; 3 Pages.
(Continued)

*Primary Examiner* — John Bedtelyon
(74) *Attorney, Agent, or Firm* — William D. Doyle

(57) ABSTRACT

A flame retardant and/or crush-resistant optical cable is provided. The cable includes a plurality of optical fibers and an inner jacket surrounding the plurality of optical fibers. The inner jacket includes an inner layer and an outer layer. The cable includes an armor layer surrounding the inner jacket. The cable includes an outer jacket surrounding the armor layer. The inner layer of the inner jacket, the outer layer of the inner jacket and/or the outer jacket are formed from one or more different material providing different properties to the cable. For example, the outer jacket may be formed from a flame-retardant, zero-halogen polymer material, the inner layer of the inner jacket may be chemically resistant to inorganic material, and the outer layer of the inner jacket may be chemically resistant to organic material.

21 Claims, 2 Drawing Sheets

Related U.S. Application Data

(60) Provisional application No. 62/203,509, filed on Aug. 11, 2015.

(56) References Cited

U.S. PATENT DOCUMENTS

| | | | |
|---|---|---|---|
| 7,367,364 | B2 | 5/2008 | Rivest et al. |
| 7,462,781 | B2 | 12/2008 | Varkey et al. |
| 8,772,638 | B2 | 7/2014 | Lumachi et al. |
| 9,927,590 | B2 | 3/2018 | Chiasson et al. |
| 2003/0099446 | A1* | 5/2003 | Witt .................. G02B 6/4495 385/109 |
| 2010/0101822 | A1* | 4/2010 | Bunker .............. C08F 255/02 174/110 SR |

FOREIGN PATENT DOCUMENTS

| | | |
|---|---|---|
| CN | 104672731 A | 6/2015 |
| EP | 0241330 B1 | 4/1993 |
| WO | 2015102818 A1 | 7/2015 |

OTHER PUBLICATIONS

Evolant® Solutions, Non-Metallic Armored Fiber Optic Buried Calbe Data Sheet; Corning; (2001) 2 Pages.

Hypron® The Lead-Free Eco-Friendly Cables for the Refinery, Petrochemical and Gas-Treatment Industries; Nexans; www.nexans.com; (2011) 4 Pages.

International Search Report and Written Opinion of the International Searching Authority; PCT/US2016/045306; dated Nov. 9, 2016; 11 Pages; European Patent Office.

Mining and Petrochemical Fiber Optic Calbes, Features and Benefits; A Lanscape® Solutions Product; Specification Sheet; (2009).

OFO Generic Cable Specification; Oman Fiber Optic Co. S.A.O.G.; Product Sheet; 4 Pages; Date Unknown.

Ohinese Patent Application No. 201680055714.X; Englsh Transaltion of the First Office Action dated Aug. 5, 2019; China Patent Office; 9 Pgs.

* cited by examiner

OPTICAL FIBER CABLE

CROSS-REFERENCE TO RELATED APPLICATIONS

This application is a continuation of International Application No. PCT/US16/45306, filed on Aug. 3, 2016, which claims the benefit of priority to U.S. Application No. 62/203,509, filed on Aug. 11, 2015, both applications being incorporated herein by reference.

BACKGROUND

The disclosure relates generally to cables and more particularly to fiber optic cables having a flame retardant cable jacket suitable for use in a harsh or outdoor environment. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to a rugged, flame retardant, crush-resistant optical cable. The cable includes a plurality of optical fibers and an inner jacket surrounding the plurality of optical fibers, the inner jacket includes an inner layer formed from a first polymer material and an outer layer surrounding the inner layer formed from a second polymer material. The cable includes an armor layer formed from a contiguous strip of metal tape material wrapped in the circumferential direction around the inner jacket. The cable includes an outer jacket surrounding the armor layer. The outer jacket has an outer surface defining an exterior surface of the cable and an inner surface facing the armor layer. The outer jacket is formed from a third polymer material. The first polymer material is different from the second polymer material and is different from the third polymer material, and the second polymer material is different from the third polymer material. The third polymer material is a zero-halogen polymer material.

An additional embodiment of the disclosure relates to an optical cable. The optical cable includes a plurality of optical fibers and an inner jacket surrounding the plurality of optical fibers. The inner jacket includes an inner layer formed from a first polymer material, and an outer layer surrounding the inner layer formed from a second polymer material. The cable includes an armor layer surrounding the inner jacket, and an outer jacket surrounding the armor layer. The outer jacket are formed from a third polymer material. At least one of the first polymer material and the second polymer material is different from the third polymer material. The third polymer material has a brittle temperature of less than −30 degrees C. as determined using ASTM D746.

An additional embodiment of the disclosure relates to an optical cable. The optical cable includes a plurality of optical transmission elements and an inner jacket surrounding the plurality of optical transmission elements. The inner jacket includes an inner layer formed from a first polymer material and an outer layer surrounding the inner layer. The outer layer is formed from a second polymer material. The optical cable includes an armor layer surrounding the inner jacket and an outer jacket surrounding the armor layer. The outer jacket is formed from a third polymer material. The first polymer material is different from the second polymer material. The third polymer material meets the cold impact resistance test at −50 degrees C. using IEC 60811-506, and the third polymer material has an elongation at break of at least 50% at −40 degrees C. as determined using IEC 60811-501.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
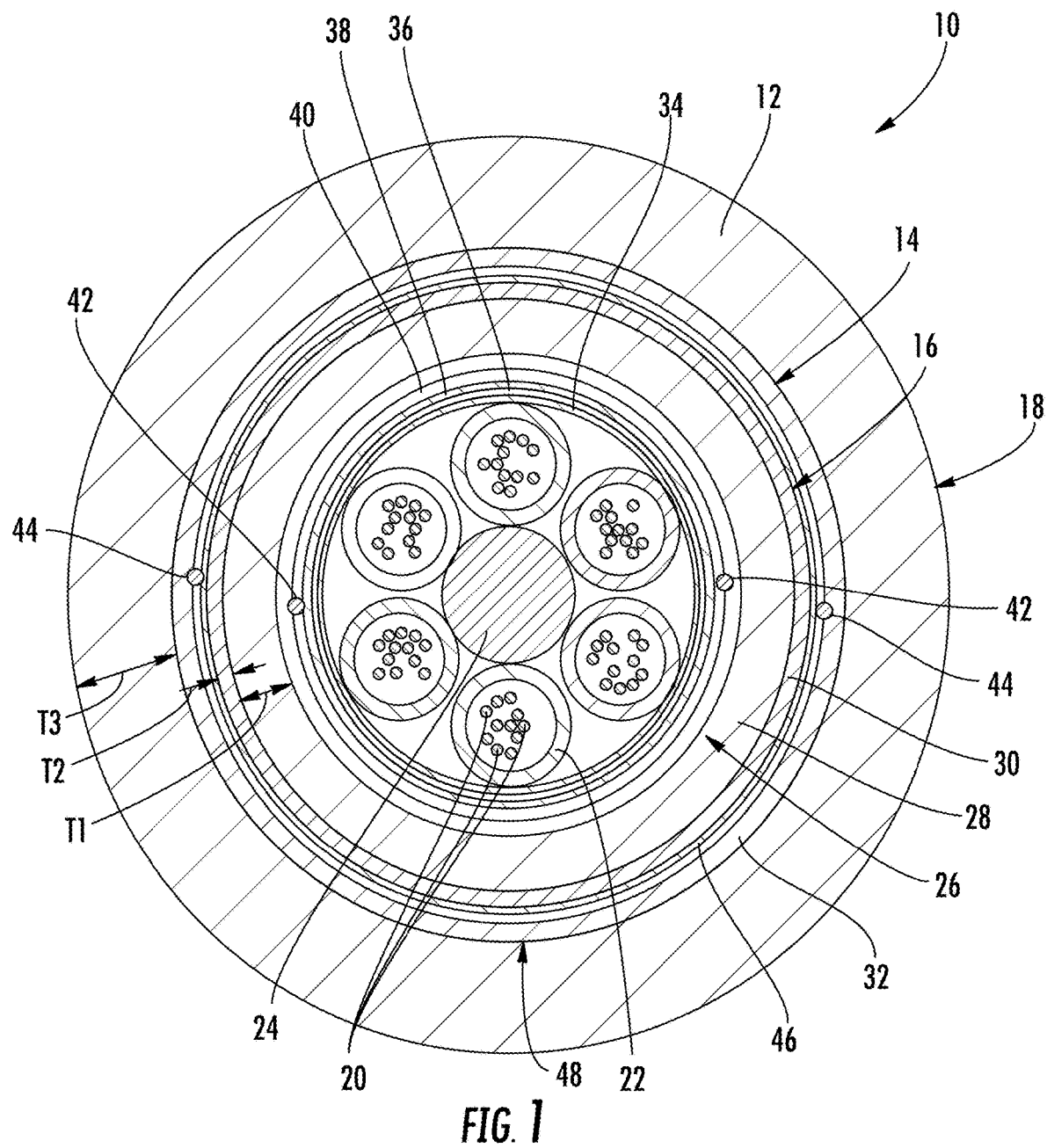
FIG. 1 is a cross-sectional view of an optical fiber cable in accordance with aspects of the present disclosure.

Referring generally to the figures, various embodiments of an optical fiber cable are shown. In general, the cable embodiments discussed herein include a specifically selected arrangement of inner and outer cable jackets that Applicant has found provides for an optical cable that performs well in a variety of harsh environments, including very low temperature environments, very high temperature environments and/or chemically harsh environments. In some embodiments the cable also provides satisfactory flame retardant and/or fire resistance characteristics. For example, Applicant has found that the cable design discussed herein is crack resistant at both high and low temperature and after exposure to harsh chemicals, provides good crush resistance and provides good torsion crack resistance while satisfying stringent burn test standards and does not emit corrosive gases during combustion. In specific embodiments, the cable design discussed herein is particularly suited for use in oil/gas industry applications, such as on shore oil/gas installations, wherein cables are potentially exposed to both very high and low temperatures and oil/gas leakages. The cable embodiments discussed herein provide these performance benefits while also decreasing cable weight as compared to conventional cables typically used in the oil and gas industry.

In various embodiments, the cable embodiments discussed herein provide the unique combinations of performance characteristics through a multi-layer cable jacket arrangement where each layer has specific materials or material properties that contribute to the overall cable performance. Specifically, in various embodiments, the cable embodiments include a multi-layer inner cable jacket that includes at least two polymer materials that provide resistance to both organic and inorganic materials. The cable embodiment also includes an outer cable jacket formed from a zero-halogen polymer material, such as a low smoke, zero-halogen material and/or a halogen free flame retardant material, that also provides the various physical performance characteristics discussed herein. In specific embodiments, Applicants have determined that an inner cable jacket having an inner layer of polyethylene containing material (e.g., a high-density polyethylene) and outer layer of a polyamide containing material and an outer cable jacket formed from an ethylene butyl acrylate, a thermoplastic polyolefin or a thermoplastic elastomer (e.g. VAMAC from Dupont, an ethylene acrylic elastomer) containing material, which provides good harsh environment performance discussed herein. Each of these three materials combine enhanced fire and oil resistance with better low temperature flexibility (without plasticizer), and better heat resistance compared to standard LSZH systems using EVA/LLDPE blends. Additionally, in specific embodiments, the cable embodiments discussed herein include an armor layer formed from a wrapped metal material, such as a wrapped corrugated steel tape, surrounding the inner jacket that adds crush resistance while at the same time facilitating formation of a lighter weight, lower diameter cable as compared to conventional oil/gas industry cables that typically use steel wire layer for crush resistance.

Referring to FIG. 1, an optical cable, shown as cable 10, is illustrated according to an exemplary embodiment. Cable 10 includes an outer jacket, shown as outer jacket 12, having an inner surface 14 that defines an inner passage or cavity, shown as central bore 16, and an outer surface 18 that generally defines the outer surface of cable 10. As will be generally understood, inner surface 14 of jacket 12 defines an internal area or region within which the various cable components discussed herein are located.

Cable 10 includes one or more optical transmission elements, shown as optical fibers 20. In the embodiment shown, groups of optical fibers 20 are located in separate buffer tubes 22, and buffer tubes 22 are wrapped (e.g., in an SZ stranding pattern) around a central strength member 24. In other embodiments, cable 10 may include any other type of optical transmission element, such as tight buffered optical fibers. Central strength member 24 may be any suitable axial strength member, such as a glass-reinforced plastic rod, steel rod/wire, etc. Generally, cable 10 provides structure and protection to optical fibers 20 during and after installation (e.g., protection during handling, protection from elements, protection from the environment, protection from vermin, etc.).

Cable 10 includes an inner jacket, shown as inner cable jacket 26. As shown, inner cable jacket 26 surrounds optical fibers 20 and buffer tubes 22. Inner cable jacket 26 includes an inner layer 28 and an outer layer 30. Outer layer 30 surrounds and is coupled to the outer surface of inner layer 28. In specific embodiments, the inner surface of outer layer 30 is directly coupled to the outer surface of inner layer 28, and in such embodiments there are no intervening layers of material between inner layer 28 and outer layer 30. In some embodiments, outer layer 30 is coupled to inner layer 28 by an inwardly directed force provided by an outer cable layer, such as outer cable jacket 12. In other specific embodiments, outer layer 30 may be bonded to inner layer 28 such that the inner surface of outer layer 30 is coupled to the outer surface of inner layer 28. In such embodiments, the interface between the inner surface of outer layer 30 and the outer surface of inner layer 28 is substantially continuous in the circumferential and longitudinal direction. In various embodiments, outer layer 30 may be coextruded with inner layer 28, and in other embodiments, outer layer 30 may be formed or extruded over inner layer 28 in a subsequent step following formation of inner layer 28.

Inner layer 28 and outer layer 30 are each formed from different materials and each separate material provides different properties to cable 10. In various embodiments, inner layer 28 is formed from a first polymer material that has better chemical resistance to inorganic material, and outer layer 30 is formed from a second polymer material that has better chemical resistance to organic materials such as oil and gas. In various embodiments, inner layer 28 is formed from a polyethylene material, such a polyethylene, compounds of polyethylene, compounds of polyethylene copolymers, etc. In a specific embodiment, inner layer 28 is formed from a high-density polyethylene (HDPE) material and outer layer 30 is formed from a polyamide material (e.g., a nylon material). In various specific embodiments, outer layer 30 may be any one of a variety of polyamide materials, including flame retardant polyamide materials and polyamide 12. In other embodiments, outer layer 30 may be any one of a variety of polyester materials, including flame retardant polyester materials such as Vestodurt®X9426, a flame retardant polybutylene terephthalate supplied by Evonik Industries of Essen, Germany. In other embodiments, inner layer 28, and outer layer 30 may be formed from any suitable polymer material. In a specific alternative embodiment, outer layer 30 is formed from a polytetrafluoroethylene (PTFE) material, a polyvinylidene difluoride, a polykeytone, an aliphatic polyketone, a polyester, a copolyester, a thermoplastic polyurethane, and/or a polyoxymethylene. In other embodiments, the arrangement of inner jacket 26 may be reversed or altered, for example, such that outer layer 30 is formed from a material that is resistant to inorganic materials, and inner layer 28 is formed from a material that is resistant to organic material. In other embodiments, cable 10 may include a single layer inner jacket or no inner jacket.

While inner jacket 26 is configured to provide good barrier properties, outer jacket 12 is configured and formed from a material that provides satisfactory flame retardant characteristics and/or satisfactory mechanical performance characteristics to cable 10. In specific embodiments, outer jacket 12 is formed from a halogen free flame retardant polymer material, which provides lower corrosivity of combustion gases compared to PVC cable jackets common in cables intended for oil/gas industry use. In various embodiments, outer jacket 12 is formed from a low smoke zero-halogen polymer material, and in specific embodiments, outer jacket 12 is formed from a polymer material that has a limiting oxygen index (LOI) of 36 or better. In specific embodiments, the material of outer jacket 12 (and possibly other cable components) allows cable 10 meets the flame retardant requirements set forth in standards IEC 60332-1-2 and IEC 60332-3-24. In various embodiments, the material of outer jacket 12 (and possibly other cable components) allows cable 10 to meet of one or more of flame retardant cable standards including UL 1685 or CSA FT4-ST1. In various embodiments, the material of outer jacket 12 (and possibly other cable components) allows cable 10 meet of one or more of flame resistant cable standards including UL 1666 or IEEE1202. In some embodiments, outer jacket 12 is formed from any material having the flame retardant characteristics and/or physical characteristics discussed herein, and in some such embodiments, outer jacket 12 is formed from a halogen containing material. In other embodiments, both outer jacket 12 and one of the layers of inner jacket 26 may be made from the same material, such as a flame retardant polymer material, a low-smoke, zero-halogen material, etc., and in such embodiments, cable 10 may be provided with additional flame retardant properties from the two distinct layers of flame retardant materials.

In various embodiments, the zero-halogen polymer of outer jacket 12 may include a flame retardant material, such as a metal hydroxide (specifically aluminum hydroxide or magnesium di hydrate), that produces water in the presence of heat/fire which slows or limits heat transfer through cable jacket 12 and limits flame spread along cable jacket 12. In one embodiment, the polymer of outer jacket 12 is an ethylene butyl acrylate containing material that includes aluminum hydroxide as a flame retardant filler. In one embodiment, the polymer of outer jacket 12 is the CONGuard S7410 S material available from CONDOR Compounds GmbH. Applicant has found that by utilizing the materials discussed herein, satisfactory burn performance and/or physical performance can be achieved without the inclusion of flame retardant bedding components, lead sheaths, or external nylon sheaths that are typically used in some oil/gas industry cable designs.

In various embodiments, the polymer material of outer jacket 12 has one or more physical characteristics that provides cable 10 with satisfactory performance in a range of harsh environments. Specifically, the cable designs discussed herein provide a single cable design that performs well both in very cold temperatures and very hot temperatures. Thus, in various embodiments, the cable designs discussed here are particularly useful in (although not limited to) the oil and gas industries. In various embodiments, outer jacket is crack and break resistant under a variety of conditions.

In various embodiments, the polymer material of outer jacket 12 has a brittle temperature of less than −30 degrees C. as determined using ASTM D746. In various embodiments, the polymer material of outer jacket 12 can meet the cold impact resistance test per IEC 60811-506 at −50 degrees C. In various embodiments, the polymer material of outer jacket 12 has a minimum elongation at break of 50% at −40 degrees C. or better as determined per ASTM D638 or IEC 60811-501. In various embodiments, the polymer material of outer jacket 12 has an elongation at break of at least 30% at 70 degrees C. or better and a minimum break stress of 1 MPa at 70 degrees C. as determined using IEC 60811-501 or using ASTM D638 with a pulling speed of 1 mm/min. Applicant has found that outer jacket 12, formed from a material with one or more of these physical characteristics, performs well in bend and torsion tests representative of the conditions that cable 10 will experience in the field, such as during the installation process.

In various embodiments, the polymer material of outer jacket 12 retains sufficient crack and break performance even after exposure to harsh chemical environments, air, water and salt water. In various embodiments, the polymer material of outer jacket 12 has a minimum elongation at break of at least 75% after being exposed to any one of the aging environments, aging temperatures and aging times shown in table 1 below, and the polymer material of outer jacket 12 has a minimum elongation at break of at least 99% after being exposed to any one of the aging environments, aging temperatures and aging times shown in table 2 below.

TABLE 1

| Aging Environment | Aging Temperature (° C.) | Aging Time (hours) | Min. E@B (%) | % Δ E@B | Min. S@B (MPa) | % Δ S@B |
| --- | --- | --- | --- | --- | --- | --- |
| Initial Values | | | 143.0 | | 11.4 | |
| ASTM #2 Oil | 70 | 4 | 112.8 | −21.1 | 8.45 | −25.9 |

TABLE 1-continued

| Aging Environment | Aging Temperature (° C.) | Aging Time (hours) | Min. E@B (%) | % Δ E@B | Min. S@B (MPa) | % Δ S@B |
| --- | --- | --- | --- | --- | --- | --- |
| Hydraulic Fluid 5606 | 50 | 24 | 91.9 | −35.7 | 7.9 | −30.7 |
| Hydraulic Fluid 17672 | 50 | 24 | 86.6 | −39.4 | 9.3 | −18.4 |
| Lubricating Oil 23699 | 50 | 24 | 115.5 | −19.2 | 10.6 | −7.0 |
| Local Diesel Fuel | 35 | 24 | 75.4 | −47.3 | 8.5 | −25.4 |
| Davies Type 1 Deicing Fluid | 50 | 24 | 130.3 | −8.9 | 11.0 | −3.5 |
| Vegetation Killer | 50 | 168 | 94.3 | −34.1 | 11.6 | 1.75 |

TABLE 2

| Aging Environment | Aging Temperature (° C.) | Aging Time (weeks) | Min. E@B (%) | % Δ E@B | Min. S@B (MPa) | % Δ S@B |
| --- | --- | --- | --- | --- | --- | --- |
| Air | 100 | 8 | 108.9 | −23.86 | 13.4 | 17.4 |
| Water | 100 | 8 | 99.2 | −30.6 | 12.3 | 8.2 |
| ASTM Salt Water | 100 | 8 | 115.7 | −19.08 | 13.1 | 14.7 |

Table 1 represents data from oil & fuel resistance tests that were performed on a specific embodiment of outer jacket material, e.g., the CONGuard S7410 S material available from CONDOR Compounds GmbH. Table 2 represents data from tests on the same material exposed to air, water and salt water. The test specimens included extruded strips of the outer jacket material, having a minimum thickness of 1 mm and a minimum width was 4 mm. The test specimens were used for determining the elongation at break (E@B) and the stress at break (S@B) with the tensile tester instrument such as MTS or Instron tensile tester at a traction speed of 50 mm/min.

In various embodiments, the thicknesses of the layers of inner jacket 26 and the thickness of outer jacket 12 are also designed to provide satisfactory performance characteristics while also providing a cable having a relatively small diameter and low weight. As shown in FIG. 1, inner layer 28 of inner jacket 26 has a thickness shown as T1, outer layer 30 of inner jacket 26 has a thickness shown as T2, and outer jacket 12 has a thickness shown as T3. In various embodiments, T2 is less than T1 and T3, and T1 is less than T3. In specific embodiments, T2 is less than 50% of T1, and T1 is less than 80% of T3. In various embodiments, T1 is between 0.5 mm and 1.5 mm, and specifically is between 0.8 mm and 1.2 mm. In various embodiments, T2 is between 0.1 mm and 0.7 mm, and specifically between 0.2 mm and 0.4 mm. In various embodiments, T3 is between 1 mm and 3 mm, and specifically between 1.2 mm and 2.2 mm. In a specific embodiment, T1 is about 1 mm (e.g., 1 mm plus or minus 10%), T2 is about 0.3 mm (e.g., 0.3 mm plus or minus 10%), and T3 is about 2 mm (e.g., 2 mm plus or minus 10%). In various embodiments, T1, T2 and T3 discussed herein are average thicknesses, and in another embodiment, T1, T2 and T3 are maximum thicknesses.

In various embodiments, cable 10 also includes an armor layer, shown as armor 32. In general, armor 32 is formed from a strip of metal material (e.g., a metal tape, a flat elongate continuous piece of material, etc.) that is wrapped around and circumferentially surrounds inner jacket 26. As shown in FIG. 1, armor 32 is located adjacent to the inner surface of outer jacket 12 such that these two layers are in contact with each other. In specific embodiments, armor 32 is corrugated steel tape material that is wrapped around the interior portions of cable 10, and in some such embodiments, armor 32 is longitudinally folded forming a longitudinal overlapped section where opposing edges of the tape overlap to completely surround inner jacket 26 (and any other interior component of cable 10). In other embodiments, armor 32 may be a strip of metal tape material, helically wrapped around inner jacket 26 such that armor 32 forms a layer circumferentially surrounding inner jacket 26. In general, armor layer 32 provides an additional layer of protection to fibers 20 within cable 10, and may provide resistance against damage (e.g., damage caused by contact or compression during installation, damage from the elements, damage from rodents, etc.).

Further, the corrugated steel tape material may include an outer coating of polymer material that forms a bond with the inner surface of outer jacket 12 when outer jacket 12 is extruded over armor 32. In a specific embodiment, the outer polymer layer of armor 32 is a polyethylene material that forms a bond with the halogen free flame retardant material based on ethylene butyl acrylate of outer jacket 12 generated from the heat and pressure as outer jacket 12 is extruded over armor 32. Applicants have found that this bond limits the appearance of wrinkles in outer jacket 12 during bending. This is in contrast to conventional PVC cable jackets that tend not to form bonds with metal tape armor layers. Applicants have found that use of corrugated wrapped armor in a flame retardant cable as discussed herein (as opposed to steel armor wire typically used in oil/gas industry cables) provides a cable with low weight and diameter without sacrificing mechanical and burn performance.

In various embodiments, cable 10 has an outer diameter between 14 mm and 18 mm, specifically between 16 mm and 17 mm, and more specifically about 16.7 mm (e.g., 16.7 mm plus or minus 1%). In addition cable 10 has a low weight relative to conventional cables intended for oil and gas industry uses. In specific embodiments, cable 10 may include between 12-72 optical fibers 20 and have a weight between 290 kg/km and 330 kg/km, and specifically of 310 kg/km. In specific embodiments, cable 10 may include between 72-96 optical fibers 20 and have a weight between 330 kg/km and 370 kg/km, and specifically of 350 kg/km. In specific embodiments, cable 10 may include between 96-120 optical fibers 20 and have a weight between 380 kg/km and 420 kg/km, and specifically of 400 kg/km. In specific embodiments, cable 10 may include between 120-144 optical fibers 20 and have a weight between 430 kg/km and 470 kg/km, and specifically of 450 kg/km. In various embodiments, the weight of cable 10 is believed to be approximately 150 kg/km lighter than conventional oil/gas industry cables, such as those that utilize PVC jacketing materials and steel wire armor materials. In particular embodiments, the cable weights discussed herein are for cables having short term tensile strength of 6000 N at a fiber strain of 0.38%. In various embodiments, the lower weight cable discussed herein may provide easier installation or deployment because the lower weight makes cable 10 easier to pull through conduit, which is a cable deployment method used commonly in oil/gas installations.

Referring to FIG. 1, in various embodiments, cable 10 includes additional components, layers and/or structures in addition to those discussed above. In various embodiments, cable jacket 12 may include first and second water blocking tape layers 34 and 38, a layer of aramid or other tensile strength yarn material 36, and a layer of Alu-tape 40 all located within inner jacket 26 and surrounding optical fibers 20 and buffer tubes 22. Water blocking tape layers 34 and 38 include a swellable super absorbent polymer material (SAP) that acts to limit water migration along the length of the cable. Alu-tape 40 is a material that forms a water barrier that limits the radial penetration of water inward toward optical fibers 20. Tensile strength yarn material 36 adds tensile strength to cable 10. In addition, cable 10 may include various helically wound binders within inner jacket 26 that helps hold the interior components together during extrusion of inner jacket 26.

In various embodiments, cable 10 may include various structures to facilitate opening or access through outer jacket 12 and/or inner jacket 26. In the embodiment shown, cable 10 includes one or more inner ripcord 42 and one or more outer ripcord 44. Inner ripcord 42 is located below Alu-tape layer 40, and facilitates access to optical fibers 20 by allowing the user to breach Alu-tape layer 40 and inner jacket 26 by pulling ripcords 42. Cable 10 may also include an additional layer of water blocking tape 46 located between inner jacket 26 and armor layer 32, and another additional layer of water blocking tape 48 located between armor layer 32 and jacket 12. In this embodiment, outer ripcord 44 is located below armor layer 32 such that outer ripcord 44 facilitates opening of both armor layer 32 and outer jacket 12. In various other embodiments, additional tensile strength yarn strands may be located within the center of the cable adjacent to buffer tubes 22, and a longitudinal piece of water blocking tape may be applied over the overlap section of armor 32.

Figure 2:
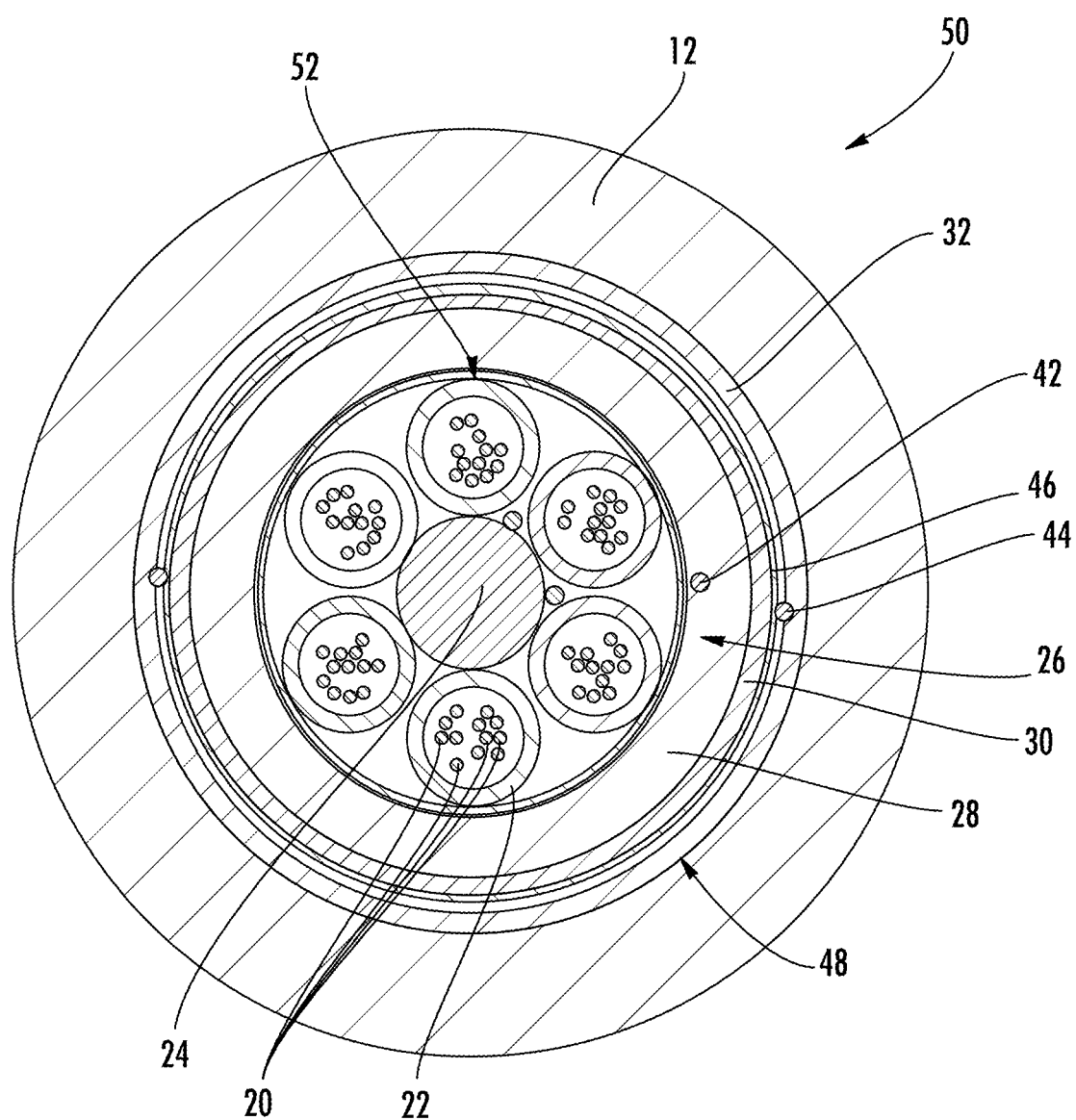
FIG. 2 is a cross-sectional view of an optical fiber cable in accordance with other aspects of the present disclosure.

Referring to FIG. 2, a cable 50 is shown according to an exemplary embodiment. Cable 50 is substantially the same as cable 10 except as discussed herein. Cable 50 is a smaller diameter version of cable 10. Cable 50 reduces the total diameter by including a tightly wrapped and low thickness inner layer 52 formed from water blocking tape layers and aramid yarn strands. Further, cable 50 eliminates the Alu-tape layer. In various embodiments, cable 10 may decrease the overall diameter by 1-2 mm relative to cable 10. In various embodiments, cable 50 has an outer diameter between 15 mm and 16 mm, and more specifically about 15.7 mm (e.g., 15.7 mm plus or minus 1%).

Applicant has performed a number of tests on a cable, such as cable 10, that uses the CONGuard S7410 S material available from CONDOR Compounds GmbH as the material of outer jacket 12 in order to verify various physical performance characteristics of cable 10.

EXAMPLE 1

Torsion and bend tests were performed to simulate installation stresses using a length of cable 20 times the diameter of the cable when a twist is introduced. These tests were performed on a cable having an outer diameter of 15 mm and having an outer jacket 12 with a thickness of 2 mm. The cable sample was coiled in four different coil arrangements, 1) coil diameter of 150 mm with no torsion, 2) coil diameter of 300 mm with no torsion, 3) coil diameter 300 mm with 360 degree twist, and 4) coil diameter 300 mm with 720 degree twist. The cable was subjected to two cycles of bending to each of the four coil arrangements at −40 degrees C. and +70 degrees C., and was also subjected to two cycles of bending to each of the four coil arrangements at −40 degrees C. and +85 degrees C. The cable sample did not exhibit cracking.

EXAMPLE 2

A second test was performed that simulates stress induced on adjacent sections of cable experienced during potential crush events that may occur when the cable is laid in a figure eight configuration. In this test, the temperature is increased from room temperature to 85 degrees C. for 2 cycles. A crush force of 40 N is applied at 85 degrees C. for 16 hours. The test is repeated at 300 N. The cable tested exhibited no cracking at either crush force level, only indentation at the contact point between cable sections.

While the specific cable embodiments discussed herein and shown in the figures relate primarily to cables that have a substantially circular cross-sectional shape defining a substantially cylindrical internal bore, in other embodiments, the cables discussed herein may have any number of cross-section shapes. For example, in various embodiments, cable jacket 12 may have an oval, elliptical, square, rectangular, triangular or other cross-sectional shape. In such embodiments, the passage or lumen of the cable may be the same shape or different shape than the shape of cable jacket 12. In some embodiments, cable jacket 12 may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A rugged, flame retardant, crush-resistant optical cable comprising:
    a plurality of buffer tubes;
    a plurality of optical fibers in each buffer tube;
    an inner jacket surrounding the plurality of buffer tubes, the inner jacket comprising:
        an inner layer formed from a first polymer material; and
        an outer layer surrounding the inner layer, the outer layer formed from a second polymer material;
    an armor layer formed from a contiguous strip of metal tape material wrapped in the circumferential direction around the inner jacket; and
    an outer jacket surrounding the armor layer, the outer jacket having an outer surface defining an exterior surface of the cable and an inner surface facing the armor layer, wherein the outer jacket is formed from a third polymer material;
    wherein the first polymer material is different from the second polymer material and is different from the third polymer material and the second polymer material is different from the third polymer material;
    wherein the third polymer material is a zero-halogen polymer material.

2. The optical cable of claim 1, wherein the third polymer material has a brittle temperature of less than −30 degrees C. as determined using ASTM D746.

3. The optical cable of claim 2, wherein the third polymer material meets the cold impact resistance test at −50 degrees C. using IEC 60811-506.

4. The optical cable of claim 3, wherein the third polymer material has an elongation at break of at least 50% at −40 degrees C. as determined using IEC 60811-501.

5. The optical cable of claim 1, wherein the third polymer material has a minimum elongation at break of 30% and a minimum break stress of 1 MPa at 70 degrees C. using ASTM D638 with a pulling speed of 1 mm/min.

6. The optical cable of claim 1, wherein the inner layer of the inner jacket has a first thickness, wherein the outer layer of the inner jacket has a second thickness, and the outer jacket has a third thickness, wherein the second thickness is less than the first thickness and less than the third thickness, wherein the first thickness is less than the third thickness.

7. The optical cable of claim 6, wherein the second thickness is less than 50% of the first thickness, and the first thickness is less than 80% of the third thickness.

8. The optical cable of claim 7, wherein the first thickness is between 0.5 mm and 1.5 mm, the second thickness is between 0.1 mm and 0.7 mm, and the third thickness is between 1 mm and 3 mm.

9. The optical cable of claim 1, wherein the first polymer material is a polyethylene containing material, wherein the second polymer material is a polyamide containing material, and the third polymer material is a flame retardant material.

10. The optical cable of claim 9, wherein the first polymer material is a high density polyethylene material, and the third polymer material is a polymer material comprising ethylene butyl acrylate.

11. The optical cable of claim 1, wherein the metal tape material is a corrugated steel tape that is wrapped around the inner jacket forming a metal tube that is continuous in the circumferential direction and continuous along at least a portion of the length of the cable.

12. An optical cable comprising:
a plurality of buffer tubes;
a plurality of optical fibers in each buffer tube;
an inner jacket surrounding the plurality of buffer tubes, the inner jacket comprising:
   an inner layer formed from a first polymer material; and
   an outer layer surrounding the inner layer, the outer layer formed from a second polymer material;
an armor layer surrounding the inner jacket; and
an outer jacket surrounding the armor layer, the outer jacket formed from a third polymer material;
wherein at least one of the first polymer material and the second polymer material is different from the third polymer material;
wherein the third polymer material has a brittle temperature of less than −30 degrees C. as determined using ASTM D746.

13. The optical cable of claim 12, wherein the third polymer material meets the cold impact resistance test at −50 degrees C. using IEC 60811-506.

14. The optical cable of claim 13, wherein the third polymer material has an elongation at break of at least 50% at −40 degrees C. as determined using IEC 60811-501.

15. The optical cable of claim 12, wherein the third polymer material has a minimum elongation at break of 30% and a minimum break stress of 1 MPa at 70 degrees C. using ASTM D638 with a pulling speed of 1 mm/min.

16. The optical cable of claim 12, wherein the inner layer of the inner jacket has a first thickness, wherein the outer layer of the inner jacket has a second thickness, and the outer jacket has a third thickness, wherein the second thickness is less than 50% of the first thickness, and the first thickness is less than 80% of the third thickness.

17. The optical cable of claim 16, wherein the first thickness is between 0.5 mm and 1.5 mm, the second thickness is between 0.1 mm and 0.7 mm, and the third thickness is between 1 mm and 3 mm.

18. The optical cable of claim 12, wherein the third polymer material contains ethylene butyl acrylate, a thermoplastic polyolefin (TPO) or a thermoplastic elastomer (TPE).

19. An optical cable comprising:
a plurality of buffer tubes
a plurality of optical transmission elements in each buffer tube;
an inner jacket surrounding the plurality of buffer tubes, the inner jacket comprising:
   an inner layer formed from a first polymer material; and
   an outer layer surrounding the inner layer, the outer layer formed from a second polymer material;
an armor layer surrounding the inner jacket; and
an outer jacket surrounding the armor layer, the outer jacket formed from a third polymer material;
wherein the first polymer material is different from the second polymer material;
wherein the third polymer material meets the cold impact resistance test at −50 degrees C. using IEC 60811-506, wherein the third polymer material has an elongation at break of at least 50% at −40 degrees C. as determined using IEC 60811-501.

20. The optical cable of claim 19, wherein the third polymer material has an elongation at break of at least 30% as determined using IEC 60811-501 and a minimum break stress of 1 MPa at 70 degrees C. as determined using IEC 60811-501, wherein the inner layer of the inner jacket has a first thickness, wherein the outer layer of the inner jacket has a second thickness, and the outer jacket has a third thickness, wherein the second thickness is less than 50% of the first thickness, and the first thickness is less than 80% of the third thickness.

21. The optical cable of claim 20, wherein the first polymer material is a polyethylene containing material, wherein the second polymer material is a polyamide containing material, and the third polymer material is a halogen-free flame retardant material.

* * * * *

UNITED STATES PATENT AND TRADEMARK OFFICE
CERTIFICATE OF CORRECTION

PATENT NO. : 10,534,149 B2
APPLICATION NO. : 15/889501
DATED : January 14, 2020
INVENTOR(S) : Holger Baetz et al.

Page 1 of 1

It is certified that error appears in the above-identified patent and that said Letters Patent is hereby corrected as shown below:

On page 2, Column 2, item (56), other publications, Line 2, delete "Calbe" and insert -- Cable --, therefor.

On page 2, Column 2, item (56), other publications, Line 9, delete "Calbes" and insert -- Cables --, therefor.

On page 2, Column 2, item (56), other publications, Line 10, delete "Lanscape" and insert -- Landscape --, therefor.

On page 2, Column 2, item (56), other publications, Line 13, delete "Ohinese" and insert -- Chinese --, therefor.

On page 2, Column 2, item (56), other publications, Lines 14-15, delete "Transaltion" and insert -- Translation --, therefor.

Signed and Sealed this
Twenty-fourth Day of March, 2020

Andrei Iancu
*Director of the United States Patent and Trademark Office*